Patented Dec. 26, 1939

2,184,538

UNITED STATES PATENT OFFICE 2,184,538

COMPOSITION OF MATTER AND PROCESSES FOR THE MANUFACTURE OF THE SAME

Charles W. J. Wende, Wilmington, Del., assignor to E. I. du Pont de Nemours & Company, Wilmington, Del., a corporation of Delaware No Drawing. Application April 7, 1938, Serial No. 200,747

3 Claims. (Cl. 23—50)

This invention relates to a new and useful composition of matter, the titanyl salt of sulfamic acid, and the method of its manufacture.

It has long been known that the sulfamic acid salts of metals which form basic oxides or hydroxides, are easily prepared by simple reaction of the basic oxide or hydroxide with sulfamic acid as described in the chemical literature by E. Berglund (Bull. Soc. Chim. (2) 29, 422–6 (1873)) and Divers and Haga (J. Chem. Soc. 69, 1645 (1896)). However, it is reported in the literature that the sulfamic acid salts of metals which form neutral or acidic oxides and hydroxides, e. g., bismuth, tin, arsenic, antimony, iron (ferric), and the like, cannot be prepared because of the great ease and rapidity with which such salts are hydrolyzed in aqueous solution. Thus, the art has not heretofore been apprised of any titanium salts of sulfamic acid, especially since titanium oxide does not react with sulfamic acid even upon warming or prolonged contact with a saturated sulfamic acid solution. Moreover, had such a reaction been possible, it would be expected from the experience with other amphoteric metals that rapid hydrolysis would take place in aqueous solution.

I have now found that by reacting in aqueous solution a titanium salt and a sulfamate, the cation of which forms a water-insoluble salt with the anion of the titanium salt, a basic titanium salt of sulfamic acid is formed and remains in solution from which it may be isolated by addition of non-solvents or by other suitable means. Possibly the normal titanium sulfamate is first formed as an intermediate, but in the presence of water is immediately hydrolyzed to a soluble titanyl sulfamate. The titanyl sulfamate may be further hydrolyzed to precipitate hydrated titanium oxide if the salt solution is heated.

The reaction, for example, may be carried out with titanium sulfate or titanyl sulfate as the titanium salt and with barium sulfamate or lead sulfamate as the sulfamate. The insoluble barium or lead sulfate is precipitated while the soluble titanyl sulfamate remains in solution. Of these two reagents, barium sulfamate is preferred on economic grounds, altho lead sulfamate forms a more readily separated precipitate. Strontium and calcium sulfamates may be used in instances where the slight solubility of their sulfates is not objectionable. In any case, the titanyl sulfamate formed may be isolated by evaporation of the solution under conditions of low heat or by the addition of such organic solvents as cause precipitation of the sulfamate. For many purposes the titanyl sulfamate solution may be used directly without isolation of the salt in solid form.

The following examples, in which the parts are by weight unless otherwise specified, illustrate the preparation of titanyl sulfamate:

Example I

A solution comprising 200 parts lead sulfamate $Pb(SO_3NH_2)_2$ dissolved in about 200 parts cold water was added with cooling to 114 parts of 53 per cent titanium chloride solution. The lead chloride precipitate was filtered off after standing for about one hour. Upon addition of methanol (1 volume) and acetone (2 volumes) a white precipitate of titanyl sulfamate formed which was removed by filtration, washed with alcohol, and dried without heating. Evaporation of the clear filtrate under reduced pressure yielded sulfamic acid. The acetone precipitated product when dissolved in water gave no reaction with potassium iodide or silver nitrate thereby indicating the absence of lead and chloride salts. The presence of free sulfamic acid in the filtrate residues indicated that titanium sulfamate had hydrolyzed to titanyl sulfamate $(TiO(SO_3NH_2)_2)$. Solutions of the latter salt precipitated titanium oxide on boiling.

Example II

Fourteen (14) parts of titanyl sulfate $$(TiOSO_4 \cdot 2H_2O)$$

was dissolved in about 150 parts water and to this solution was added a solution of 19.5 parts lead sulfamate, $Pb(SO_3NH_2)_2$ dissolved in 35 parts of water. After standing for a short period the precipitated lead sulfate was removed by filtration. The titanyl sulfamate, $TiO(SO_3NH_2)_2$, was then precipitated from the clear filtrate by the addition of about 2 volumes methanol and 2 volumes acetone. The precipitate was gelatinous in character. It was collected on a filter and allowed to dry without heating. No free sulfamic acid was observed in the filtrate, indicating that hydrolysis had not progressed beyond the titanyl stage. The final dry product was a white powder which was readily soluble in water. When a water solution of titanyl sulfamate was heated the salt was hydrolyzed, a white precipitate of titanium oxide being formed.

Paper impregnated with titanyl sulfamate in solution and dried became stiff and had a parchmentized appearance. When the treated paper was heated and again placed in water, the titanium present in the paper formed a gel which swelled but remained in the paper.

Various salts of titanium may be used for the preparation of titanyl sulfamate providing that the anion of the titanium salt combines with the cation of the sulfamate to form an insoluble salt which may be removed by filtration, centrifuging, or similar procedures. The titanyl sulfamate which remains in solution may be isolated by evaporation of the solution, or by precipitation by means of organic solvents, or by other well known methods of reducing solubility of a salt in water. For many uses, it is not necessary to isolate the titanyl sulfamate since the solutions prepared by the methods given may be used for many purposes as such. In such case it may be desirable partially to neutralize any excess sulfamic acid by addition of a suitably reactive base.

Still another way to make titanyl sulfamate is to react potassium titanium sulfate in aqueous solution with a sulfamate, such as calcium sulfamate, the cation of which forms a sulfate relatively insoluble in water and thereafter, if desired, precipitating any of the cation remaining in solution as a soluble salt. For example, any calcium remaining in solution may if desired be precipitated and disposed of as the oxalate.

The above description and examples are intended to be illustrative only. Any modification of or variation therefrom which conforms with the spirit of the invention is intended to be included within the scope of the claims.

Titanyl sulfamate shows the property of being comparatively stable in aqueous solutions at ordinary temperature but readily hydrolyzing at increased temperatures. Hence, porous materials such as paper may be impregnated with solutions of titanyl sulfamate. Upon drying such impregnated materials by means of heating, titanium oxide is precipitated within the treated object. The acid formed by hydrolysis may be extracted by washing with water, which treatment does not appreciably remove the precipitated titanium oxide; or it may be hydrolyzed to ammonium acid sulfate by continued heating in the presence of water, and removed by washing or precipitated as an insoluble sulfate. Titanyl sulfamate may also be used for the tanning of leather, or for the preparation of titanium pigments.

I claim:

1. The method of preparing a basic sulfamate of tetravalent titanium which comprises reacting in aqueous solution titanium tetrachloride and a sulfamate the cation of which forms an insoluble chloride.

2. A basic salt of tetravalent titanium and sulfamic acid.

3. Titanyl sulfamate.

CHARLES W. J. WENDE.